United States Patent [19]

Cox

[11] 4,033,619
[45] July 5, 1977

[54] TRANSPARENT TAILGATE FOR STATIONWAGONS AND PICKUP TRUCKS

[75] Inventor: Diane M. Cox, Depew, N.Y.

[73] Assignee: The Raymond Lee Organization, Inc., New York, N.Y.

[22] Filed: July 21, 1975

[21] Appl. No.: 597,702

[52] U.S. Cl. .............................. 296/21; 40/129 C; 40/219; 296/50

[51] Int. Cl.² ........................................ D60R 13/00

[58] Field of Search ................. 296/50, 51, 53, 54, 296/55, 56, 5 R, 57 A, 58, 59, 60, 149, 1 C, 21, 52; 350/259; 40/129 C, 219

[56] References Cited

UNITED STATES PATENTS

| 1,627,473 | 5/1927 | Zilbersher | 296/21 |
|---|---|---|---|
| 2,240,586 | 5/1941 | Thompson | 296/146 |
| 2,591,380 | 4/1952 | Schreiner | 296/51 |
| 2,668,735 | 2/1954 | Brockway | 296/146 |
| 3,140,579 | 7/1964 | Skakel | 40/219 |
| 3,181,911 | 5/1965 | Peras | 296/56 |
| 3,537,944 | 11/1970 | Grubb | 350/259 |
| 3,771,243 | 11/1973 | Rolph | 40/129 C |
| 3,802,530 | 4/1974 | Purcell | 296/146 |
| 3,838,882 | 10/1974 | Locklin | 296/53 |
| 3,851,867 | 12/1974 | Fricko | 296/56 |
| 3,866,969 | 2/1975 | Sandrock | 296/146 |

Primary Examiner—Joseph F. Peters, Jr.
Assistant Examiner—John A. Carroll
Attorney, Agent, or Firm—Stephen Wyden

[57] ABSTRACT

A transparent panel with the manufacturer's name embedded therein in a tailgate to improve the rear vision of the driver and for safety, the transparent panel may be one-way glass.

1 Claim, 2 Drawing Figures

TRANSPARENT TAILGATE FOR STATIONWAGONS AND PICKUP TRUCKS

I have invented an improvement in tailgates for pickup trucks and stationwagons that eliminates the blindspots that opaque tailgates cause. By inserting a clear panel of plexiglass or one-way glass in the center of the tailgate and permanently encasing the letters of the brand name, such as "Ford" in the glass, the car can be identified from the outside and the driver can see from the inside out, while the privacy of the cabin is maintained if one-way glass is used.

My invention can be understood in view of the accompanying figures.

Figure 1:
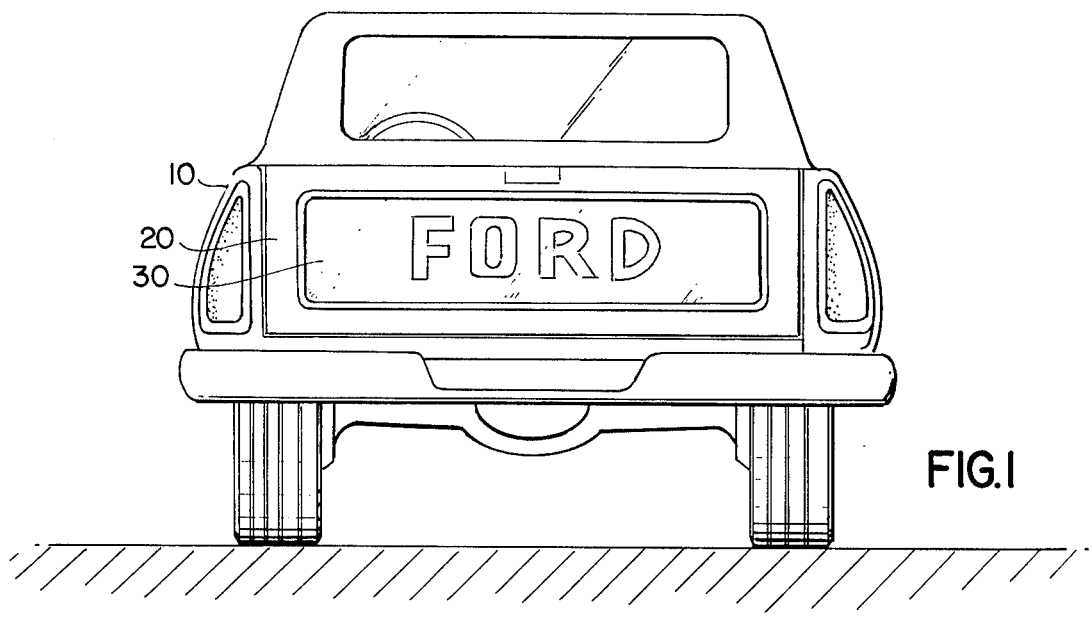
FIG. 1 shows a rear view of a Pick Up truck with a transparent panel.

In FIG. 1, a pick up truck 10 has a tailgate 20 with a transparent central panel 30 through which a driver can see directly behind himself and thereby avoid hitting children or other objects directly behind him.

Figure 2:
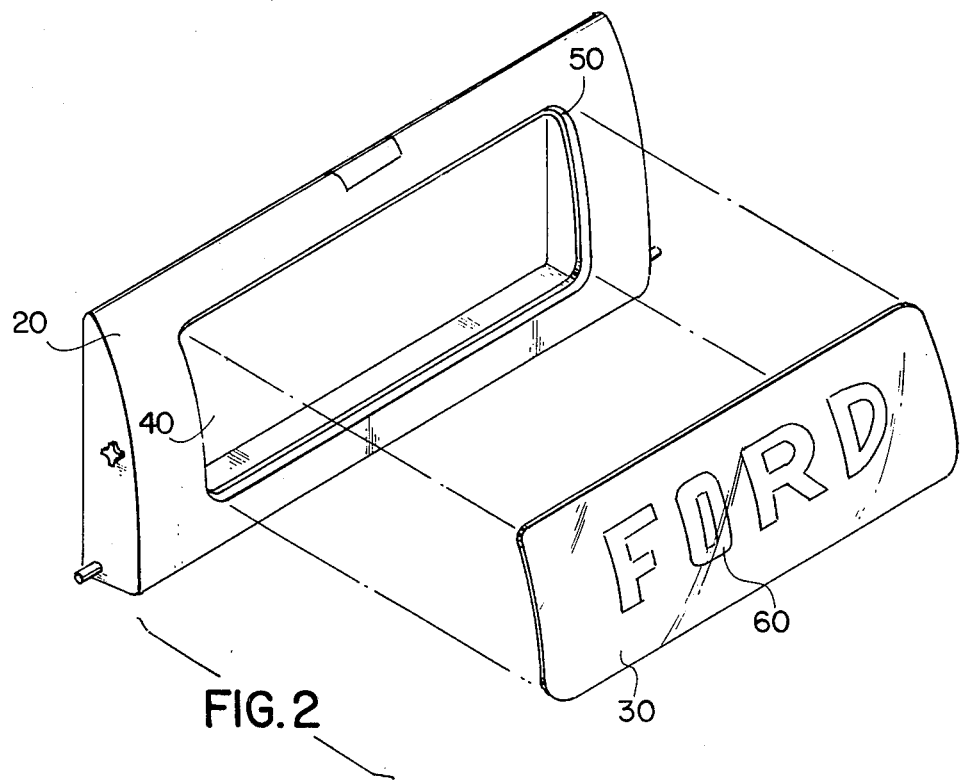
FIG. 2 shows the details of construction of the tailgate in an exploded view.

In FIG. 2, the tailgate 20 has a central aperture 40 in which is mounted 50 a transparent panel, 30, preferably made of plexiglass or one-way glass with the letter of the manufacturers name 60 embedded preferably, in the bonding layer of the plexiglass, thereby preventing their being scratched or worn out.

Having described a preferred embodiment of my invention, it is understood that various changes can be made without departing from the spirit of my invention, and, I desire to cover by the appended claims all such modifications as fall within the true spirit and scope of my invention.

What I claim and seek to secure by Letters Patent is:
1. A tailgate for station wagons and pickup trucks, comprising:
   a tailgate having recessed central aperture,
   a transparent panel mounted within said recessed central aperture, and
   indicia embedded in said transparent panel, wherein said transparent panel is formed of a one-way glass, thereby being transparent from inside the cabin of the station wagon or pickup truck only.

* * * * *